United States Patent
Holbrook et al.

(10) Patent No.: US 9,594,612 B2
(45) Date of Patent: Mar. 14, 2017

(54) SYSTEM AND METHOD OF A HARDWARE SHADOW FOR A NETWORK ELEMENT

(71) Applicants: Hugh W. Holbrook, Santa Clara, CA (US); Sriram Sellappa, Santa Clara, CA (US)

(72) Inventors: Hugh W. Holbrook, Santa Clara, CA (US); Sriram Sellappa, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 98 days.

(21) Appl. No.: 14/270,190

(22) Filed: May 5, 2014

(65) Prior Publication Data

US 2015/0006953 A1 Jan. 1, 2015

Related U.S. Application Data

(60) Provisional application No. 61/841,190, filed on Jun. 28, 2013.

(51) Int. Cl.
*G06F 11/00* (2006.01)
*G06F 11/07* (2006.01)
(Continued)

(52) U.S. Cl.
CPC ...... *G06F 11/0724* (2013.01); *G06F 11/1658* (2013.01); *G06F 11/2028* (2013.01);
(Continued)

(58) Field of Classification Search
CPC ............. G06F 11/0724; G06F 11/1658; G06F 11/2028; G06F 11/2097; G06F 11/2033;
(Continued)

(56) References Cited

U.S. PATENT DOCUMENTS 4,228,496 A * 10/1980 Katzman ............. G06F 12/1458
700/82
6,772,337 B1 * 8/2004 Yener .................. H04L 63/0435
380/279

(Continued)

FOREIGN PATENT DOCUMENTS

CA  EP 1331772 A1 * 7/2003 ............. H04L 45/00
EP  1 331 772 B1    3/2006

OTHER PUBLICATIONS

European Search Report, EP 14 17 4858, dated Feb. 4, 2015, 2 pgs.

*Primary Examiner* — Bryce Bonzo
*Assistant Examiner* — Katherine Lin
(74) *Attorney, Agent, or Firm* — Blakely, Sokoloff, Taylor & Zafman LLP

(57) ABSTRACT

A method and apparatus of a device that uses a hardware shadow for a central processing unit failover is described. In an exemplary embodiment, a device receives a signal that the active central processing unit has failed, where the active central processing unit controls the processing functions of the network element and the network element includes a hardware forwarding engine and a hardware shadow. The hardware shadow additionally includes multiple shadow tables. For each shadow table, the device copies data from that shadow table to a corresponding table in the hardware forwarding engine, where the hardware shadow is a copy of the data stored in hardware tables for the hardware forwarding engine. In response to the copying, the device further switches control of the network element processing functions from the active central processing unit to a standby central processing unit.

24 Claims, 17 Drawing Sheets

(51) Int. Cl.
*H04L 29/08* (2006.01)
*G06F 11/20* (2006.01)
*H04L 29/14* (2006.01)
*G06F 11/16* (2006.01)

(52) U.S. Cl.
CPC ........ *G06F 11/2097* (2013.01); *H04L 69/321* (2013.01); *H04L 69/40* (2013.01); *G06F 11/2033* (2013.01); *G06F 11/2038* (2013.01)

(58) Field of Classification Search
CPC ............. G06F 11/2038; G06F 11/2056; G06F 11/2058; G06F 11/2061; G06F 11/2064; G06F 11/2066; G06F 11/2069; G06F 11/2071; G06F 11/2074; G06F 11/2076; G06F 11/2079; G06F 11/2082; G06F 11/2084; G06F 11/2087
See application file for complete search history.

(56) References Cited

U.S. PATENT DOCUMENTS

| | | | |
|---|---|---|---|
| 6,941,487 B1 * | 9/2005 | Balakrishnan | H04W 24/04 370/216 |
| 2004/0025078 A1 * | 2/2004 | Nagano | G05B 19/058 714/11 |
| 2006/0262716 A1 | 11/2006 | Ramaiah et al. | |
| 2008/0074075 A1 * | 3/2008 | Davis | H02P 23/0077 318/800 |

* cited by examiner

| HW TABLE 802 |
|---|
| ENTRY 804A |
| ENTRY 804B |
| ENTRY 804C |

| HW SHADOW TABLE 806 |
|---|
| ENTRY 804C |
| ENTRY 804B |
| ENTRY 804A |

FIGURE 8

HW TABLE 902

| "SAFE" RULE 908 |
| EXISTING ENTRY 904 |
| NEW ENTRY 906 |

FIGURE 9

SYSTEM AND METHOD OF A HARDWARE SHADOW FOR A NETWORK ELEMENT

RELATED APPLICATIONS

Applicant claims the benefit of priority of prior, provisional application Ser. No. 61/841,190, filed Jun. 28, 2013, the entirety of which is incorporated by reference.

FIELD OF INVENTION

This invention relates generally to data networking, and more particularly, to using a hardware shadow to support a failover from an active central processing unit to a standby central processing unit.

BACKGROUND OF THE INVENTION

A network element can include two different planes that are used to process network traffic, a control plane and a data plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane controls these processing functions of the data plane by configuring the data plane, managing data collected by the data plane, monitoring the data plane, and other management functions. The control plane gathers the configuration data from different sources (e.g., locally stored configuration data, via a command line interface, or other management channel such as Simple Network Management Protocol (SNMP)) and configures the data plane using this configuration data.

In addition, the control plane will include multiple central processing units (CPUs) to control the processing functions of the network element. There can be an active CPU that is actively controlling the processing functions of the network element and a standby CPU that takes over control of the network element processing in the event of a CPU failure of the active CPU. The active CPU could fail due to a hardware failure of the CPU itself or a component that the active CPU uses (e.g., memory, controller, bus, or another hardware component). Alternatively, the active CPU may fail due to a software failure.

In the event of the active CPU failure, the standby CPU takes over the control of the network element processing functions. In this case, the data plane can continue to operate while the standby CPU takes control. In order for the standby CPU to assume control of the network element processing functions, the standby CPU of the control plane will need access to the hardware tables of the data plane. The control plane uses these hardware tables to configure the data plane, monitor the data plane, gather statistics of the data plane, and other functions. In order to access the hardware tables, the standby CPU builds a software index that allows the standby CPU to access the data in the hardware tables. The standby CPU can either build the software index from scratch upon a CPU failure or can actively build and maintain the software index prior to the CPU failure. Building the software index from scratch can take a long time and interrupt the ability of the control plane to function. Building and maintaining the software index prior to the CPU failure can remove this control plane downtime, however, building and maintaining a standby software index can be a complicated process that is difficult to implement and can lead to version problems because the active software index has one version (or structure) and the standby software index has another version or structure.

SUMMARY OF THE DESCRIPTION

A method and apparatus of a device that uses a hardware shadow for a central processing unit failover is described. In an exemplary embodiment, a device receives a signal that the active central processing unit has failed, where the active central processing unit controls the processing functions of the network element and the network element includes a hardware forwarding engine and a hardware shadow. The hardware shadow includes multiple shadow tables. For each shadow table, the device copies data from that shadow table to a corresponding hardware table in the hardware forwarding engine, where the hardware shadow is a copy of the data stored in hardware tables for the hardware forwarding engine. In response to the copying, the device further switches control of the network element processing functions from the active central processing unit to a standby central processing unit.

In another embodiment, the device receives a hardware shadow update, where the hardware shadow is used as part of passing control of processing functions of the network element from an active central processing unit to a standby central processing unit in response to a failure occurring with the active central processing unit. In addition, the hardware shadow includes configuration data for one of a plurality of hardware forwarding engines of the network element. Furthermore, the hardware shadow update is an update to one of a plurality of shadow tables of the hardware shadow. The device further applies the update to the hardware shadow for the one of the plurality of hardware shadow tables.

In a further embodiment, the device receives a signal that the active central processing unit has failed, where the active central processing unit controls the processing functions of the network element and the network element includes a hardware forwarding engine. In addition, the network element includes a hardware shadow and a partial software index for a standby central processing unit. Furthermore, for each hardware table in the plurality of hardware tables referenced by the partial software index, the device switches control to the standby central processing unit of a processing function of the network element that utilizes data stored in that hardware table. In addition, for each shadow table in a plurality of shadow tables in the hardware shadow, the device copies data from that shadow table to a corresponding table in the hardware forwarding engine, where the hardware shadow is a copy of the data stored in a plurality of hardware tables for the hardware forwarding engine and is data not referenced by the partial software index. Furthermore and in response to the copying, the device switches control to the standby central processing unit of a processing function of the network element that utilizes data associated with that shadow table.

In another embodiment, the device receives an update, where the update is an update for one of a hardware shadow and a partial software index. In addition, the hardware shadow is used to failover control of processing functions of the network element from an active central processing unit to a standby central processing unit, the hardware shadow includes configuration data for one of a plurality of hardware forwarding engines of the network element and the partial software index references data stored in a plurality of hardware tables and not stored in the hardware shadow. Furthermore, the device determines if the update is for the hardware shadow or the partial software index. If the update is for the hardware shadow, the device applies the update to one of the plurality of hardware shadow tables of the hardware shadow. If the update is for the partial software index, the device applies the update to the partial software index.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 8 is a block diagram of one embodiment of a hardware table and a corresponding shadow hardware table.

FIG. 9 is a block diagram of one embodiment of a hardware table being updated using a safe rule.

DETAILED DESCRIPTION

Figure 1:
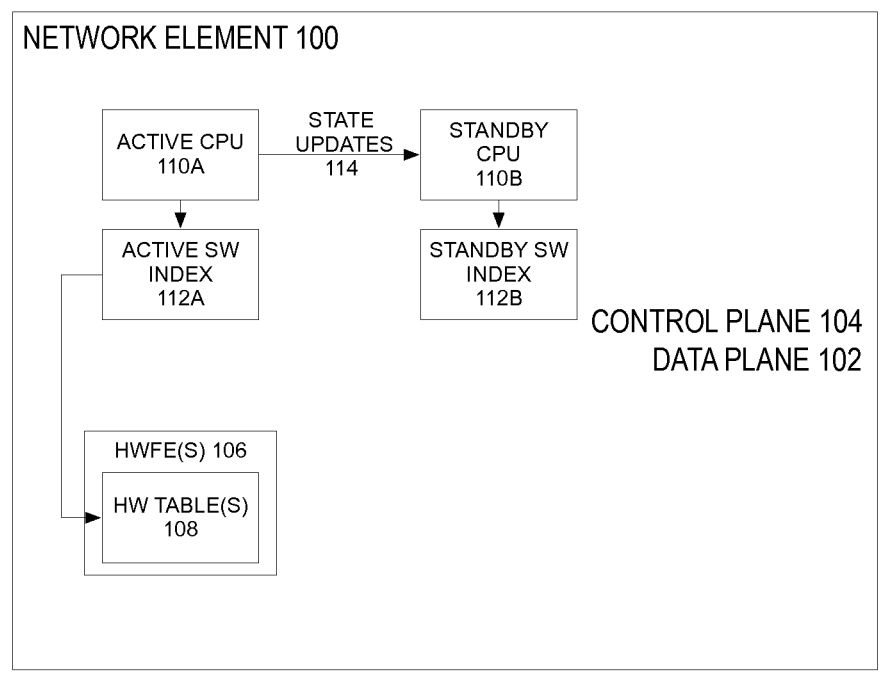
FIG. 1 is a block diagram of one embodiment of a network element that includes multiple central processing units.

A method and apparatus of a device that uses a hardware shadow for a central processing unit failover is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that uses a hardware shadow for a CPU failover is described. In one embodiment, a device includes a control plane and a data plane. The data plane receives, processes, and forwards network data using various configuration data, while the control plane controls the processing functions of the data plane and other processing functions of the network element. In one embodiment, the data plane includes one or more hardware forwarding engines that are used to process the network data received and transmitted by the network element. Each of these hardware forwarding engines includes one or more hardware tables that are used to store the configuration data for the hardware forwarding engines, gather monitoring data about that hardware forwarding engine, and store other information for the hardware forwarding engine. In one embodiment, the control plane includes two CPUs, an active CPU to control the network element processing functions and a standby CPU to take over this control in the event that the active CPU fails. While the active CPU is functioning, the active CPU sends updates to the standby CPU regarding the hardware tables for the hardware forwarding engines. The standby CPU uses these updates to build and maintain a hardware shadow of the data that is stored in the hardware tables.

In one embodiment, the hardware shadow is a copy of the data values stored in the hardware tables, but does not necessarily need to be in the same structure as the data stored in the hardware tables. In one embodiment, the hardware shadow includes one or more tables that are copies of the tables in the hardware tables. For example and in one embodiment, the hardware shadow can include a routing table, a media access control (MAC) address table, an access control list (ACL), and/or other tables. In addition, the standby CPU builds and maintains a software index for that hardware shadow, which allows the standby CPU to access the data in the hardware table. Upon failure of the active CPU, the standby CPU copies the data in hardware shadow to the hardware tables and uses the standby software index to access the data in the hardware tables.

In one embodiment, the hardware forwarding engines continue to process network data during the data copying from the hardware shadow to the hardware tables. In order to maintain a consistent state for processing functions that use one of the tables during the data copying, the standby CPU inserts a safe rule into a hardware table that is to be updated with data from the hardware shadow. In one embodiment, the safe rule puts this processing function in a consistent state during the time when the data is copied over from the hardware shadow table to the corresponding table in the hardware table. For example and in one embodiment, the safe rule can be a rule to drop all packets processed during this time period. The safe rule is removed by the time the data copying for that hardware table is completed. In another embodiment, co-processors are used to speed up the data copying. In another embodiment, a safe rule is not used. Instead the hardware tables are updated in a safe order that allows a consistent state to be maintained while the tables are being updated.

In one embodiment, a hybrid approach is used to support a CPU failover. In this embodiment, the standby CPU maintains a partial software index for some of the data stored in the hardware tables and uses a hardware shadow for the rest of the data stored in the hardware tables. For example and in one embodiment, the standby CPU builds and maintains a partial software index for one or more of the large hardware tables (e.g., routing table, MAC address table, ACL, and/or other large tables) and uses the hardware shadow for other tables in the hardware. Upon a CPU failover, the standby CPU uses the partial software index to directly access the data for these tables referenced by the partial software index. In addition, the standby CPU copies the data in the hardware shadow to the hardware tables and uses the standby software index to access the data in the hardware tables.

FIG. 1 (prior art) is a block diagram of one embodiment of a network element 102 that includes multiple central processing units (CPUs) for failover. In FIG. 1, the network element 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network data, the data plane determines a destination address of that packet, looks up the requisite information for that destination in one or more tables stored in the data plane, and forwards the packet out the proper outgoing interface. The data plane 102 includes one or more hardware forwarding engines 106 that can each receive, process, and/or forward network traffic. In one embodiment, each hardware forwarding engine 106 includes a set of hardware tables 108. In one embodiment, the hardware tables 108 store configuration data, monitoring data, reporting data, and/or other management data for the hardware forwarding engine 106. The hardware table(s) 108 are further described in FIG. 2 below.

In one embodiment, the control plane 104 gathers the management data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and writes this configuration data to hardware table(s) 108. In one embodiment, the control plane 104 includes an active central processing unit (CPU) 110A, a standby CPU 110B, an active software index 112A, and a standby software index 112B. In one embodiment, the active CPU 110A is a CPU that is used to control the processing functions of the network element 100. For example and in one embodiment, the active CPU 110A controls the configuration of the hardware forwarding engine(s) 106, retrieves the stored monitoring data, retrieves stored statistics, retrieves stored activity bits, and retrieves current status of the hardware forwarding engines (e.g., link status, interrupts, error indication), and/or retrieves learned mac addresses). In one embodiment, the active CPU 110A uses the active software index 112A to access the hardware table(s) 108 in one of the hardware forwarding engine(s) 106. In one embodiment, the active software index 112A is a set of tables that is used by the active CPU 110A to reference each individual table in the hardware tables 108. For example and in one embodiment, the active software index 112A includes pointers, offsets, and/or other references that the active CPU 110A uses to access the data stored in the hardware table(s) 108.

In one embodiment, the active CPU 110A can fail. For example and in one embodiment, the active CPU 110A can fail due to a hardware problem in the CPU itself or in a hardware component the active CPU 110A uses (e.g., memory, bus, or other hardware component). Alternatively, the active CPU 110A can fail due to a software problem. In the case of failure, the standby CPU 110B takes over control of the network processing. During failover, the hardware forwarding engines 106 continue to process network data while the control of the network processing is switched over from the active CPU 110A to the standby CPU 110B. In one embodiment, the standby CPU 110B maintains a standby software index 112B that the standby CPU 110B uses in case of a CPU failover. Similar to the active software index 112A, the standby software index 112B can be a set of tables that is used by the standby CPU 110B to reference each individual table in the hardware table(s) 108. For example and in one embodiment, the standby software index 112B includes pointers, offsets, and/or other references that the standby CPU 110B uses to access the data stored in the hardware table(s) 108. In this embodiment, the standby software index 112B is an exact copy of the active software index 112A, both in terms of the data stored in the index and the structure of the index. In one embodiment, the active CPU 110A sends state updates 114 for the standby software index 112B to the standby CPU 110B. The standby CPU 110B uses these state updates 114 to update the standby software index 112B. Upon a failure of the active CPU 110A, the standby CPU 110B assumes control of the network element processing functions by using the standby software index 112B to access the hardware table(s) 108 of the hardware forwarding engine(s) 106.

In one embodiment, where the two indices 112A-B are exact copies, it is difficult to maintain the standby software index 112B. For example and in one embodiment, maintaining the standby software index 112B is complex and prone to software errors. In addition, there are problems because if the version of software on the standby is different from the version of software on the active, the standby software index 112B may be expected to take a different form than the active software index.

Figure 2:
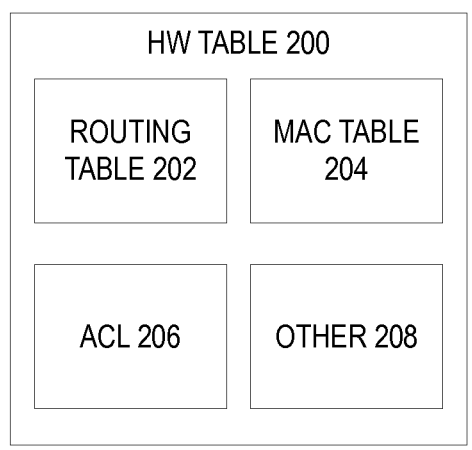
FIG. 2 is a block diagram of one embodiment of a hardware table.

FIG. 2 is a block diagram of one embodiment of a hardware table 200. In one embodiment, the hardware table 200 is used to configure the hardware forwarding engine such as the hardware forwarding engines 106 as described in FIG. 1. In one embodiment, the hardware table 200 is used to store configuration data, monitoring data, reporting data, statistics, and any other data the hardware forwarding engine uses or collects. In one embodiment, the hardware table 200 includes routing table 202, MAC table 204, ACL 206, and other tables 208. For example and in one embodiment, the routing table 202 stores routing table entries which may be produced by any of the running protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), protocol independent multicast (PIM), distance vector multicast routing protocol (DVMRP), and any/or other type or unicast or multicast routing protocol known in the art. The routing table entries may be used to forward packets that are encoded with one of the address families known in the art such as IPv4 unicast, IPv6 unicast, IPv4 multicast, or IPv6 multicast. The MAC table 204 is a table of MAC addresses known to the hardware forwarding engine and Virtual Local Area Network (VLAN)s and ports that these MAC address are associated with. In one embodiment, the MAC table is used for layer 2 forwarding. In another embodiment the MAC table records a MAC address and VLAN and an associated tunnel interface. This tunnel may be a Virtual eXtensible LAN (VXLAN) tunnel, a Generic Routing Encapsulation (GRE) tunnel, an L2TP tunnel, an Internet Protocol (IP)-in-IP tunnel, a Multiprotocol Label Switching (MPLS) label, or one of any number of tunneling formats known in the art. In one embodiment, the ACL 206 consists of an ordered series of rules, where each rule has a match criterion and action. In this embodiment, the ACL 206 is applied to the network data against these rules in order, and taking the action of the first rules that matches. In one embodiment, the other tables 208 is set of one or more tables that is used to store statistics, monitoring data, other configuration data, stored events, management data, and/or other data the hardware forwarding engine uses or collects.

Figure 3:
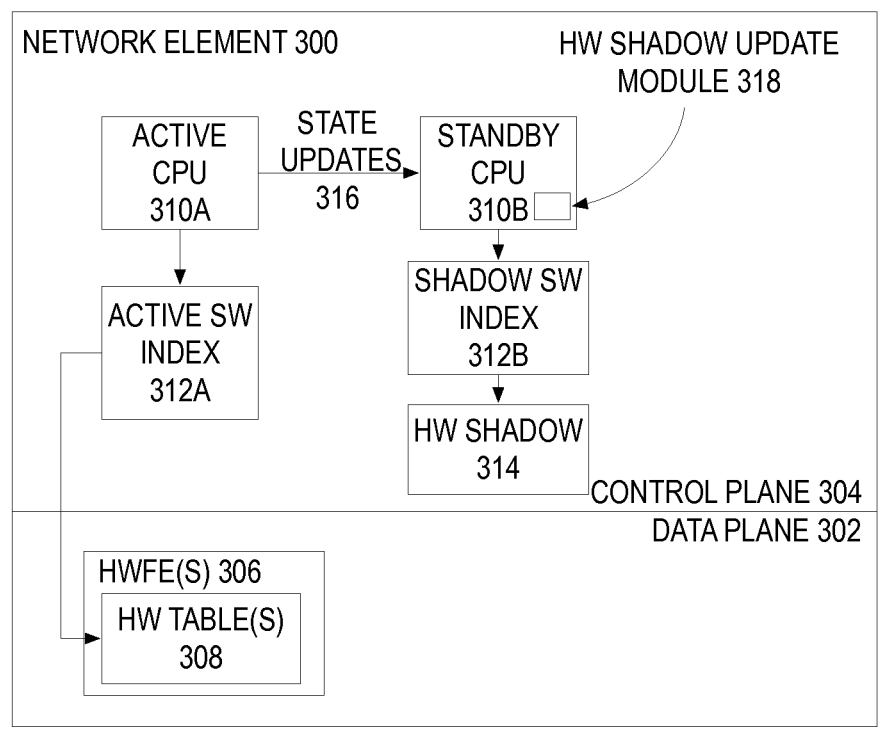
FIG. 3 is a block diagram of one embodiment of a network element that includes a hardware shadow.

FIG. 3 is a block diagram of one embodiment of a network element 300 that includes a hardware shadow 314. In FIG. 3, the network element 300 includes a data plane 302 and a control plane 304. In one embodiment, the data plane 302 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 302 includes one or more hardware forwarding engines 306 that can each receive, process, and/or forward network traffic. In one embodiment, each hardware forwarding engine 306 includes a set of hardware tables 308. In one embodiment, the hardware tables 308 stores configuration data, monitoring data, reporting data, and/or other management data for the hardware forwarding engine 308.

In one embodiment, the control plane 304 includes an active central processing unit (CPU) 310A, a standby CPU 310B, an active software index 312A, a shadow software index 312B, and a hardware shadow 314. In one embodiment, the active CPU 310A is a CPU that is used to control the processing functions of the network element 300. For example and in one embodiment, the active CPU 310A controls the configuration of the hardware forwarding engines 306, retrieves the stored monitoring data, retrieves stored activity bits, and retrieves current status of the hardware forwarding engines (e.g., link status, interrupts, error indication), and/or retrieves learned mac addresses). In one embodiment, the active CPU 310A uses the active software index 312A to access the hardware tables in one of the hardware forwarding engine(s) 306. In one embodiment, the active software index 312A is a set of tables that is used by the active CPU 310A to reference each individual table in the hardware tables 308. For example and in one embodiment, the active software index 312A includes pointers, offsets, and/or other references that the active CPU 310A uses to access the data stored in the hardware table(s) 308.

In one embodiment, the hardware shadow 314 is a copy of the data stored in the hardware tables 308. For example and in one embodiment, the hardware shadow 314 includes tables such as a routing table, a MAC table, ACL, and other tables that are found in the hardware tables 308. In one embodiment, the hardware shadow 314 is a representation of the data stored in the hardware tables 308. In this embodiment, the hardware shadow 314 does not need to have the same order as the hardware tables 308 but has the same data. For example and in one embodiment, the routing table entries in the hardware shadow are a permutation of the data of the routing table that is in the hardware tables 308. That is, in this example, the entries are the same, but the ordering of the entries in the tables is different. In another embodiment, the entries in the hardware shadow are neither in the same format nor in the same order as the entries in the hardware, but correlate with the entries in the hardware table. That is, given an entry read from the hardware, one can check if it is present in the hardware shadow and vice versa.

In one embodiment, the control plane 304 also includes a shadow software index 312B. In this embodiment, the standby CPU 310B uses the shadow software index 312B to access the data in the hardware shadow 314. For example and in one embodiment, the shadow software index 312B includes pointers, offsets, and/or other references that the standby CPU 310B uses to access the data stored in the hardware shadow 314. Because the hardware shadow is not an exact copy of the hardware table(s) 308, the shadow software index 312B is different from the active software index 312A. In one embodiment, the active CPU 310A sends state updates 316 for the hardware shadow 314 to the standby CPU 310B. In this embodiment, the state updates 316 include updates to the data stored in the hardware table(s) 308. In one embodiment, the software index messages passed from the active CPU 310A to standby CPU 310B are "state update" messages instructing the standby CPU 310B to update its "management state" without indicating specifically where in the hardware tables the corresponding forwarding engine state is to be placed. In one embodiment, the standby CPU 310B uses the message contents to update its software index but not the hardware shadow. In this embodiment, the hardware shadow is updated by separate hardware shadow update messages (as described below) for the corresponding table coming from the active CPU 310A. In another embodiment, the standby CPU 310B uses the generic state message to update its software index and its hardware shadow, using similar software as is run on the active CPU 310A. The difference is that with the standby CPU 310B, the standby CPU 310B writes to the hardware shadow, but not to the real hardware. In this embodiment, the software index normally indicates precisely where and how a route, MAC address, or other hardware table entry is stored in the hardware.

For example and in one embodiment, the updates sent by the active CPU 310A to the standby CPU 310B are generic state updates. In this example, a generic state update describes the action taken for the update without specifying the location or format of the data modified or stored in a hardware table. A generic state update can be of the form of "add route 1.2.3.0/24 with next hop ROUTER2" or "delete route 3.4.5.6/32." These are high level updates that describe the action to be taken and are independent with how the data is represented in the hardware, the data structures, or the software storage format that is used to record them in the software index. Other examples of a generic state update can be "insert MAC address 4.5.6 on port 33 in VLAN 99" or "delete MAC address 4.5.6 in VLAN 99". Thus, the generic state updates are high level and without an indication of how the update is programmed in hardware or an assumption about how the state is translated to and stored in the software index of the standby CPU 310B. This has two key benefits. One, this allows the software that manages the software index on the active CPU 310A and standby CPU 310B to be different. Two, the exchange of state updates does not depend on how the standby updates its software index.

Alternatively, the updates can be at a "hardware shadow" level. At this level, an update would include the action to be taken and the location of the data in the hardware table. For example and in one embodiment, the active CPU 310A would send updates to the standby CPU 310B such as "put entry 1.2.3.0/24 pointing at ROUTER2 at index 6789 in the hardware routing table." Alternatively the shadow could be location independent, saying "put entry 1.2.3.0/24 at ROUTER2 into the hardware routing table". In this example, the format is the same or close to the hardware representation. Because the format is the same or close, the content and structure of the hardware shadow would not be that different between the active and standby even if they are running different software versions.

In one embodiment, a useful aspect having the generic state and hardware shadow updates is that these two types of updates can be going on while the active CPU 310A is running. Upon a switchover, a reconciliation takes place between (a) what is in the hardware shadow and the hardware ("a first reconciliation") and (b) what is in the hardware shadow and what is in the software index ("a second reconciliation").

In one embodiment, the first reconciliation simply pushes the hardware shadow to the hardware. This is a straight forward operation and can use bulk updates as described in FIGS. 4 and 6 below. The push of the shadow to the hardware can also use a coprocessor, which enables the push to run in the background, asynchronously from the main CPU. Furthermore, if the hardware shadow on the standby CPU 310B closely tracks what is actually in the hardware, then little, if any, changes will be made to the state in the hardware forwarding engine tables. It is possible that updates can be lost if made to the hardware before the active CPU 310A crashed and prior to the update being applied to the hardware shadow on the standby CPU 310B. This can be minimized by making sure that the active CPU 310A sends frequent updates to the standby CPU 310B.

In an alternative embodiment, the updates at the hardware shadow can be elided if, at the point of a switchover from active CPU 310A to standby CPU 310B, the standby CPU 310 CPU 310B is willing to read the hardware of the hardware forwarding engine into the local hardware shadow. This alternative embodiment may be useful when reading the hardware is fast either because the tables are small or because the number of hardware forwarding engines managed by the system is small. If there are a large number of hardware forwarding engines managed by the active CPU 310A (and/or standby CPU 310B after switchover) then it can be expensive to rebuild the hardware shadow after a switchover. In that case, the shadow can greatly accelerate the takeover.

In another embodiment, the second reconciliation is to check that each entry in the hardware is also in the software index and vice-versa. In this embodiment, this reconciliation is used to make sure that the software index is consistent with the hardware shadow, as the software index may need to maintain data structures that record which hardware forwarding engine table entries are free and in use. The second reconciliation phase makes this state in the software index consistent with the state in the hardware shadow. This "rebuilding" of the software index is further described in FIG. 13 below.

After the first reconciliation, the hardware shadow is synchronized with the hardware. Thus, in the second reconciliation, standby CPU 310B does not have to read from the hardware and, instead, refers to the hardware shadow.

In a further embodiment of the hardware shadow updates described above, the active supervisor can write directly into the hardware shadow of the standby supervisor over a shared bus. For example and in one embodiment, the active CPU 310A and standby 310B may be connected with a point-to-point PCIe link in which the DRAM of the standby CPU 310B is directly addressable by the active CPU 310A. In addition, other connections could be used or a reliable transport protocol (e.g., transport control protocol (TCP) or stream control transport protocol (SCTP) running over IP over Ethernet could also carry the updates to the shadow from active to standby).

Figure 4:
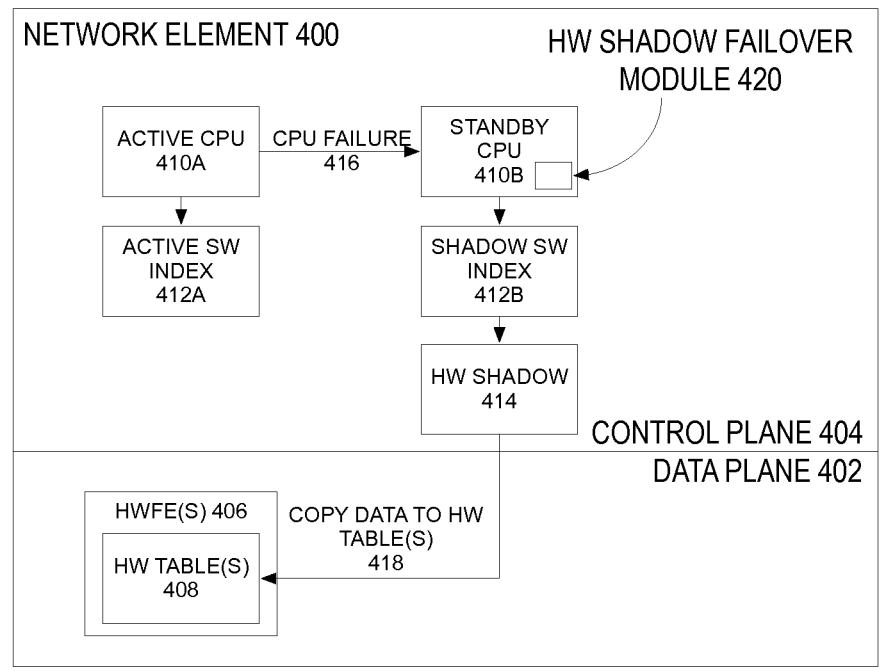
FIG. 4 is a block diagram of one embodiment of a network element that uses hardware shadow for a CPU failover.

FIG. 4 is a block diagram of one embodiment of a network element 400 that uses hardware shadow 414 for a CPU failover. As in FIG. 3, in FIG. 4, the network element 400 includes a data plane 402 and a control plane 404 as described above in FIG. 3. In addition, the control plane includes an active CPU 410A, active software index 412A, standby CPU 410B, shadow software index 412B, and hardware shadow 414. In addition, in FIG. 4, the active CPU 410A has failed. In one embodiment, the active CPU 410A can fail due to a hardware or software failure. In response to the active CPU failure, a CPU failure signal 416 is sent to the standby CPU 410B. In one embodiment, the standby CPU 410B receives this signal and begins the process of assuming control of the network element processing functions. In this embodiment, during the failover, the hardware forwarding engine(s) 406 continue to process network data. In one embodiment, because the data in the hardware shadow 414 has a different order than the data stored in the hardware table(s) 408, the data from the hardware shadow 414 is copied 418 to the hardware table(s) 408. In one embodiment, the data is copied using bulk data transfers with co-processors. In another embodiment, the one or more of hardware table(s) 408 are inserted with a "safe" rule that allows the processing functions associated with that hardware table 408 to be in a consistent state during the copying of the data. Handling of a failover is further descried in FIGS. 6-9 below. In one embodiment, the standby CPU 410B includes a hardware shadow failover module 420 that uses the hardware shadow for CPU failover.

Figure 5:
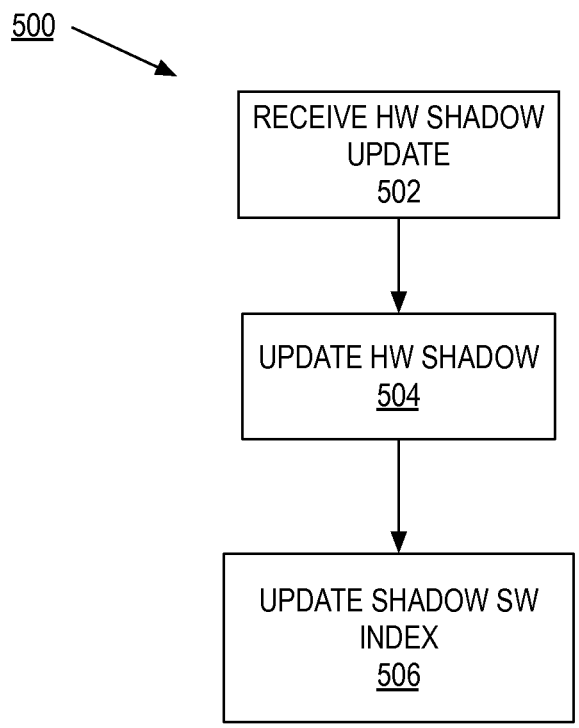
FIG. 5 is a flow diagram of one embodiment of a process to update a hardware shadow.

FIG. 5 is a flow diagram of one embodiment of a process 500 to update a hardware shadow. In one embodiment, a hardware shadow update module performs process 500, such as the hardware shadow update module 318 as described in FIG. 3 above. In FIG. 5, process 500 begins by receiving an update for the hardware shadow at block 502. In one embodiment, process 500 receives the hardware shadow update from the active CPU such as the active CPU 310A as illustrated in FIG. 3 above. In one embodiment, the update is a hardware shadow update that includes an action, data, and structure information as described in FIG. 3 above. In this embodiment, the update is used to update an entry in one of the tables in the hardware shadow. In one embodiment, the update can be adding a new entry for a table, deleting an entry for a table, and modifying that entry. For example and in one embodiment, the update could be an additional entry for a routing table that is part of the hardware shadow. In another example, the update could be the deletion of an access control list rule. As a further example, the update can be a modification to a MAC address port association.

At block 504, process 500 updates the hardware shadow. In one embodiment, process 500 determines which table the update is for and updates that table accordingly. For example and in one embodiment, if process 500 receives an update to add an entry to a routing table, process 500 determines which routing table is to be updated and adds that entry to that routing table. In this embodiment, because the data in the hardware shadow table does not have to have the same structure or order as the corresponding table in the hardware table(s), process 500 can update this entry in the same or different structure. In one embodiment, the hardware shadow has the same or similar order as the data in the corresponding table of the hardware tables, process 500 can update this entry using the structural information in the update. For example and in one embodiment, for an update that is "put entry 1.2.3.0/24 with next hop ROUTER2 at index 6789 in the hardware routing table," process 500 would put the entry in the shadow of the hardware routing table at index 6789 (but not in the actual hardware table).

In another embodiment, if the update were to delete an entry, process 500 locates the entry for that table in the hardware shadow. Once the entry was located, process 500 deletes the entry and updates the hardware table accordingly. For example and in one embodiment, process 500 deletes this entry leaving an empty space in that table. In another example, process 500 could delete that entry and compact the table so that there are no empty entries in that table. In a further example of an embodiment, if the update is to modify an existing entry, process 500 would find that entry in the corresponding table and modify the entry accordingly. As a further example, the update can be a modification to a MAC address port association. For example, the MAC address may have switched ports from Port 1 to Port 2. In this example, process 500 updates the port association for that MAC address in the MAC address table accordingly in hardware shadow.

Process 500 updates the shadow software index of block 506. An update to the hardware shadow does not need to update the shadow software index (e.g., this can be delayed until "second reconciliation" time). In one embodiment, the update to the software index could be done earlier in order to reduce the amount of work done in the second reconciliation phase. In this embodiment, the software index is updated to record what "high level" entry is at what location in the hardware table. In this embodiment, the shadow can be the inverse of information in the software index. The shadow will say that entry 6789 of Table T contains hardware bits 0x0102030018. The software index is updated by inverting the hardware shadow and translating the hardware bits 0x0102030018 into some meaningful "high level" state (e.g., the route 1.2.3.0/24). Furthermore, to show how the software index is updated in response to a shadow update, when a shadow update indicates that table entry 6789 stores hardware route 1.2.3.0/24, then the software index is updated to associate 1.2.3.0/24 with table entry 6789.

Figure 6:
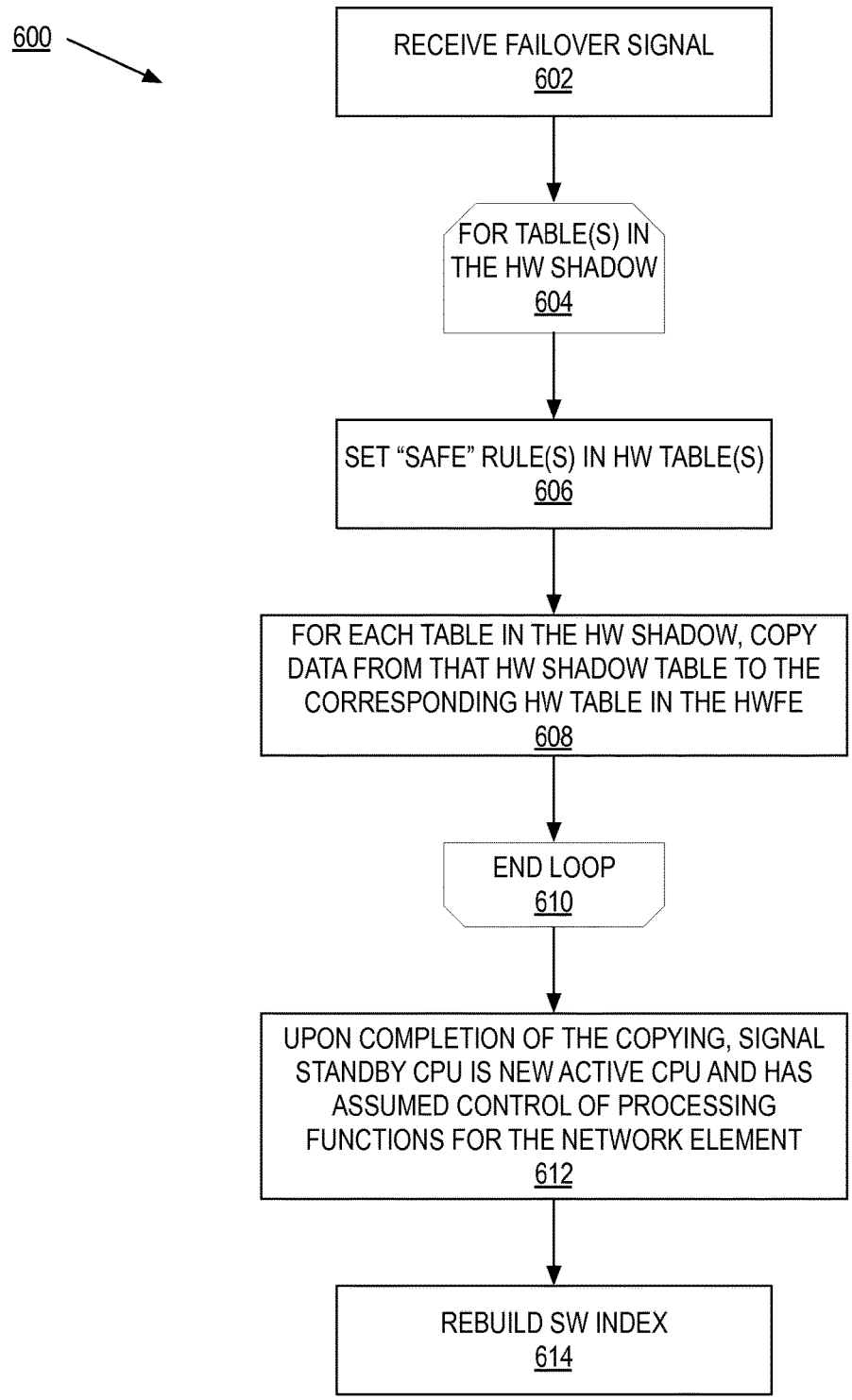
FIG. 6 is a flow diagram of one embodiment of a process to use a hardware shadow for a CPU failover.

FIG. 6 is a flow diagram of one embodiment of a process 600 to use a hardware shadow for a CPU failover. In one embodiment, a hardware shadow failover module performs process 600, such as the hardware shadow failover module 420 as described in FIG. 4 above. In FIG. 6, process 600 begins by receiving a failover signal at block 602. In one embodiment, process 600 receives the failover signal from a watchdog component of the network element. In one embodiment, the CPU failover signal can be a hardware failure or software failure. Process 600 performs a processing loop (block 604-block 610) for each table in the hardware shadow to copy the data from that table in the hardware shadow to a corresponding table in the hardware tables. At block 606, process 600 sets a safe rule in the hardware table that corresponds to the table in the hardware shadow being operated on by process 600. In one embodiment, process 600 sets the safe rule for tables that could affect them and any processing function associated with that table. In one embodiment, the safe rule puts the processing function in a consistent state during the time when the data is copied over from the hardware shadow table to the corresponding table in the hardware table. For example and in one embodiment, process 600 could set a drop all packets rule for the access control list or the routing table. In this example, the network element would drop all the packets for that hardware forwarding engine during the time when the data is copied over for those access control or routing processing functions. While in one embodiment, a safe rule is added for each table in the hardware table that is receiving data from the hardware shadow tables, in alternate embodiments, the safe rule is added to one or some of the tables in the hardware tables during the copy of the data. In one embodiment, the safe rule can be the same or different for the different hardware tables. In another embodiment, the safe rule is not needed for the table because the hardware table can be updated in a "safe" way that does not require a safe rule or results in temporarily inconsistent or undesirable hardware behavior.

At block 608, process 600 copies data from the hardware shadow table to the corresponding hardware table in the hardware forwarding engine. In one embodiment, the copying can be done using a coprocessor associated with that hardware forwarding engine. In this embodiment the coprocessor does bulk data copying, which can be faster than element by element copy using a CPU. In one embodiment, the coprocessor copies the data by accessing the data from the DRAM memory in the network element where the hardware shadow table is stored. In this embodiment, the coprocessor uses a peripheral component interface (PCI) bus to copy the data over to the hardware tables. In another embodiment, process 600 copies the data in bulk by the coprocessor asynchronously so as to allow the standby CPU to perform other processing tasks while the copying from shadow to hardware is taking place. In one embodiment, the safe rule for the target hardware table is overwritten by the time the data copying is completed. The processing loop ends at block 610.

At block 612, upon completion of the data copying in the processing loop above, process 600 signals that the standby CPU is the new active CPU and has assumed control of the processing functions for the network element. At block 614, process 600 rebuilds the software index for the standby CPU. In one embodiment, this is the second reconciliation described above. In one embodiment, the software index for the standby CPU is the shadow software index that the standby CPU built and maintained prior to the CPU failover. For example and in one embodiment, process 600 uses the shadow software index that was built and maintained as described in FIG. 5 above.

Figure 7:
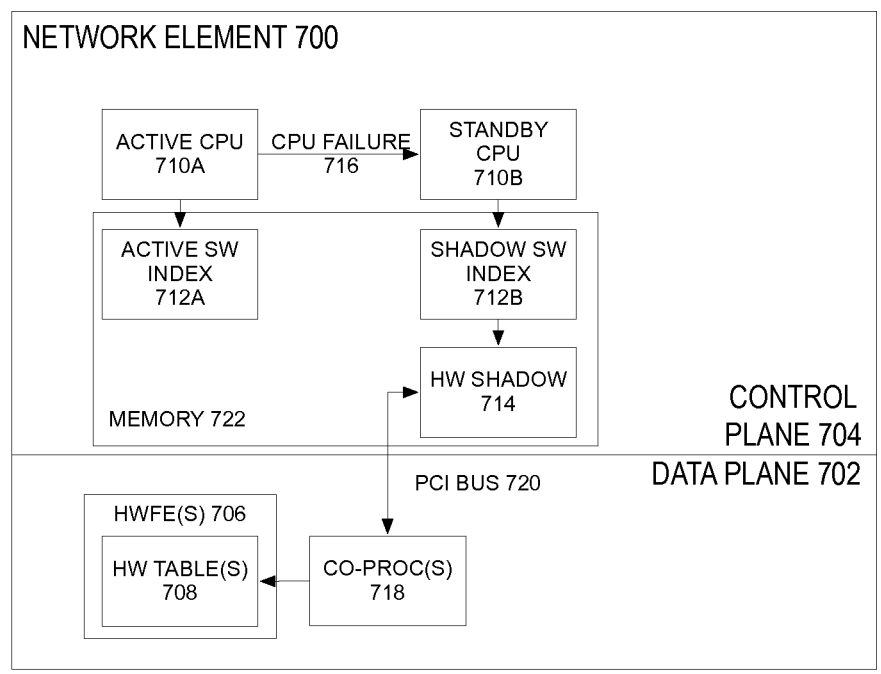
FIG. 7 is a block diagram of one embodiment of a network element to use a co-processor for bulk updating of hardware table(s) from a hardware shadow.

As described above, process 600 can take advantage of a coprocessor to do bulk data copying from the shadow hardware table to the hardware tables in the hardware forwarding engine. In this embodiment, the coprocessor accelerates data copying. FIG. 7 is a block diagram of one embodiment of a network element configured to use a co-processor for bulk updating of hardware table(s) from a hardware shadow. As in FIG. 3, in FIG. 7, the network element 700 includes a data plane 702 and a control plane 704. In addition, the control plane includes an active CPU 710A, active software index 712A, standby CPU 710B, shadow software index 712B, and hardware shadow 714. In one embodiment, the active software index 712A, standby CPU 710B, shadow software index 712B, and hardware shadow 714 are stored in memory 722. Memory 722 can be DRAM-type memory or another type of memory. In addition, in FIG. 7, the active CPU 710A has failed, resulting in a CPU failure signal 716 being sent to the standby CPU 710B. In one embodiment, the standby CPU 710B receives this signal and begins the process of assuming control of the network element processing functions. In this embodiment, during the failover, the hardware forwarding engines 706 continue to process network data. In one embodiment, because the data in the hardware shadow 714 has a different order than the data stored in the hardware table(s) 708, the data from the hardware shadow 714 is copied using co-processor(s) 718 to the hardware table(s) 708. In one embodiment, the data is copied using bulk data transfers with co-processor(s) 718 using a PCI bus 720 that interconnects the co-processor(s) 718 with the memory 722. In this embodiment, using the bulk data transfers speed up the process of copying the data from the hardware shadow table 714 to the hardware table(s) 708 and lessens the time in which the hardware table(s) is being updated.

In one embodiment, the hardware shadow table includes a copy of the data stored in the hardware table(s). However, the data in hardware shadow table is not necessarily in the same order as the data stored in a corresponding hardware table. FIG. 8 is a block diagram of one embodiment of a hardware table 802 and a corresponding hardware shadow table 806. In FIG. 8, the hardware table 802 has the entries 804A-C in the order of entry 804A, entry 804B, and entry 804C. In contrast, hardware shadow table 806 is a permutation of the entries because the hardware shadow table has the same entries, but in a different order. For example and in one embodiment, the hardware shadow table 806 has the entries 804A-C in the order of entry 804C, entry 804B, and entry 804A.

As per above, the entry order of the data in the hardware shadow tables may not be the same as the entry order in a corresponding table in the hardware tables. For example and in one embodiment, if the active CPU 310A was sending high-level updates to the standby CPU 310B to update the software index of the standby CPU 310B, but it is not sending the hardware shadow updates. In this example, the standby CPU 310B in this case is building its local hardware shadow using its own software (which may be a different version than that which is running on the active) and as a result the shadow that it built locally is different from the way the tables were programmed by the active CPU 310B.

Consequently, during the copying of the data to a hardware table, the hardware table may have different entries and a processing function relying on this table may have undesired behavior during the time in which the hardware table is being copied. In order to alleviate the potentially undesired behavior, a safe rule can be added to the target hardware table that leaves the hardware table in a consistent state during the data copying. FIG. 9 is a block diagram of one embodiment of a hardware table 902 being updated using a safe rule. In FIG. 9, the hardware table includes a "safe" rule 908 as the initial entry in the table. The next entry is an existing entry 904, which is an entry that existed prior to the data copying. The final entry is a new entry 906. In one embodiment, the safe rule 908 is a rule that leaves the hardware in a consistent state, such that the behavior of a processing function that uses this table is consistent during the data copying. For example and in one embodiment, a "safe" rule 908 could be a rule to drop all packets, forward all packets to the CPU for software processing, forwards the packets temporarily to a different hardware forwarding engine in the same system, where that other hardware forwarding engine's tables are not being updated at the same time. Sending the packets to the CPU allows for slow but correct forwarding. Sending the packets to another hardware forwarding engine allows for correct forwarding with little performance drag, but can be done by a network element with more than one hardware forwarding engine. While in one embodiment, the safe rule 908 is illustrated as an entry in the hardware table 902, in alternate embodiments, the safe rule 908 can be in another type of data structure (e.g., a rule associated with that table, but not stored in the table, etc.). In one embodiment, the safe rule 908 is overwritten or otherwise removed upon completion of the data copying for that hardware table 902. In another embodiment, instead of using a safe rule, the hardware tables are updated in a safe order that allows for a consistent state to be maintained while the table is being updated.

In one embodiment, the hardware shadow does not store the data in the same order as the data in the hardware tables, the hardware shadow data is copied over to the hardware table upon a CPU failover. This copying of the hardware shadow data can take some time to update the hardware tables. In order to alleviate the copying time, a hybrid hardware shadow scheme can be employed. In one embodiment, the hardware tables can include a few large tables (e.g., routing table, MAC address table, and/or ACL), and many smaller other tables. In this embodiment, a standby software index is built for the one or more large tables, and a reconciliation at failover time is done in which entries in the software index are associated with their corresponding location(s) in hardware. This is done by examining the contents of the hardware shadow and using this state to update pointers in the software index. In this embodiment, the hardware shadow is maintained on the standby by the process and update messages that are described in FIG. 3 above.

In this embodiment, associating the hardware entries with entries in the software index may also be wholly or partially performed before the switchover by monitoring updates to the hardware shadow. In one embodiment, this is desirable in order to reduce the amount of work that is done at switchover time.

In an alternative embodiment, the reconciliation can take place by reading the hardware to learn which entry is stored where in the hardware tables. This, however, is slow by comparison with reading the hardware shadow (e.g., can be up to 100-1000 times slower). Thus, there is an incentive to maintaining and reading from the hardware shadow rather than reading from the hardware.

In one embodiment, using a partial software index eliminates some or all of the time spent copying the hardware shadow to hardware, reduces or eliminates the need for a disruptive copy from shadow to hardware performed on a switchover (which means no disruption in packet forwarding and the use of a safe rule is not needed). In addition, using a hardware shadow in conjunction with the partial software index helps because this combination accelerates the reconciliation process that is done upon a switchover.

In one embodiment, for the other hardware tables, a hardware shadow is built and maintained by management software running on the standby, and upon becoming active after a failover, the newly active software initiates a copy to the hardware tables from the shadow software index. In this embodiment, upon a CPU failover, the standby partial software index is used for access to the one or more large tables in the hardware table and the other tables are updated with the data stored in the hardware shadow table.

Figure 10:
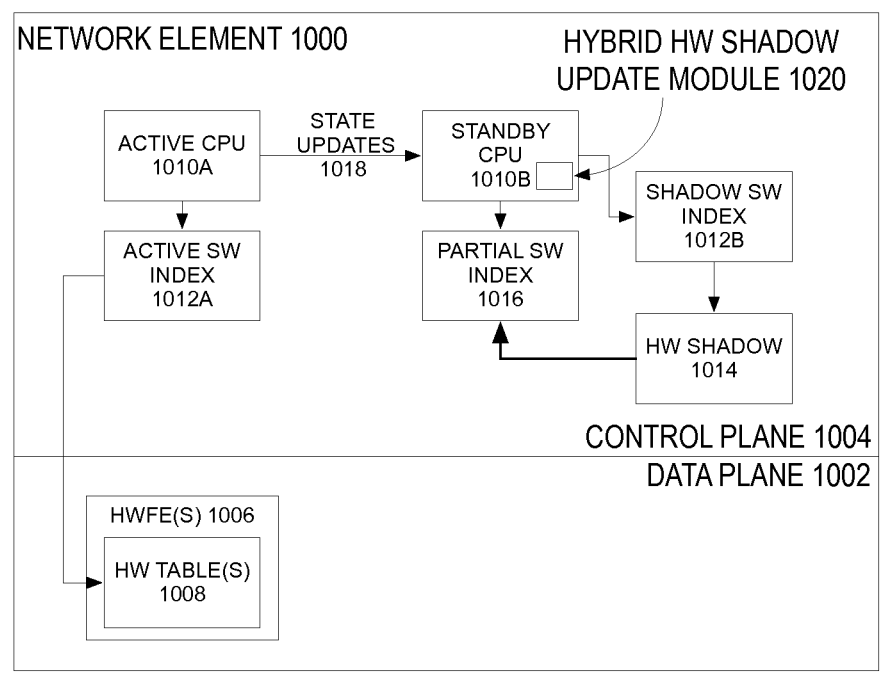
FIG. 10 is a block diagram of one embodiment of a network element that includes a hardware shadow and a partial software index.

FIG. 10 is a block diagram of one embodiment of a network element 1000 that includes a hardware shadow 1014 and a partial software index 1016. In FIG. 10, the network element 1000 includes a data plane 1002 and a control plane 1004. In addition, the control plane includes an active CPU 1010A, active software index 1012A, standby CPU 1010B, partial software index 1016, shadow software index 1012B, and hardware shadow 1014. In one embodiment, the active CPU 1010A, standby CPU 1010B, active software index 1012A, and state updates 1018 are as described in FIG. 3.

In one embodiment, the standby CPU 1010B uses a hybrid approach for maintaining hardware table information. In this embodiment, the standby CPU 1010B builds and maintains a partial software index 1016 that the standby CPU 1010B will use to access one or some of the tables in the hardware table(s) 1008. For example and in one embodiment, the standby CPU 1010B builds and maintains a partial software index 1016 for one or more of the large tables in the hardware table(s) 1008 (e.g., routing table, MAC address table, ACL, etc.). In one embodiment, the partial software index 1016 is a software index like the standby software index of FIG. 1 above, but is used for some of the hardware table(s) 1008 and not all of these tables. In one embodiment, and in addition to the partial software index 1016, the standby CPU 1010B builds and maintains a hardware shadow 1014 that is used to keep a copy of the data in the hardware table(s) that are not referenced by the partial software index 1016. In this embodiment, upon a CPU failover, the standby CPU 1010B uses the partial software index 1016 to access the data in the hardware table(s) 1008 that are referenced by the partial software index 1016 and uses the hardware shadow 1014 to update the data in the hardware table(s) that are not referenced by the partial software index. In one embodiment, the hardware shadow 1014 is used to reconcile with the partial software index 1016 upon the standby CPU 1010B becoming active. The reconciliation is done to make sure that the partial software index properly records where in the hardware any given entry is stored. In one embodiment, the standby CPU 1010B can use a safe rule during the data copying as described above. In one embodiment, the standby CPU 1010B includes a hybrid hardware shadow update module 1020 that updates the hardware shadow and partial software index.

Figure 11:
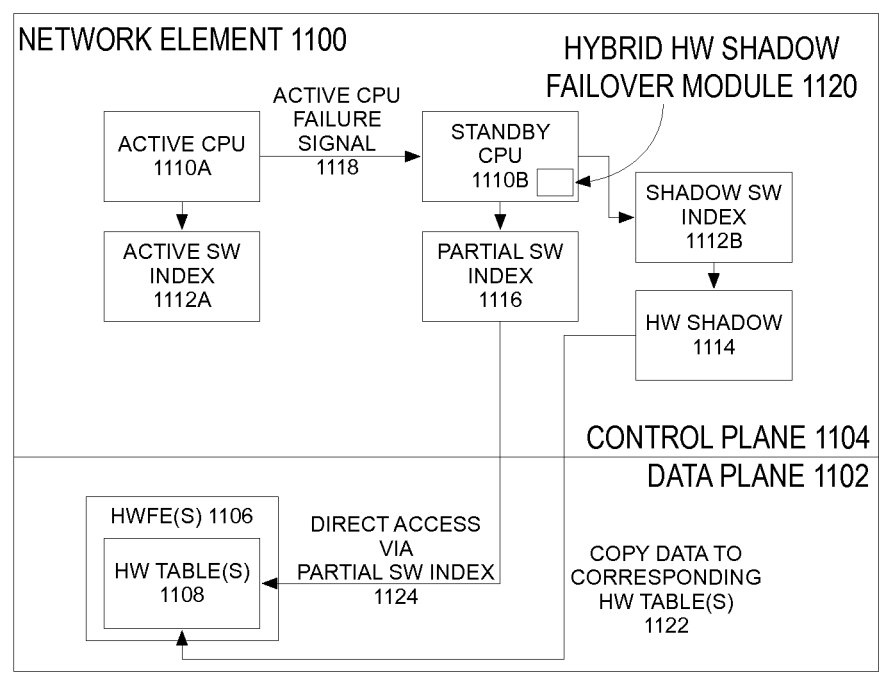
FIG. 11 is a block diagram of one embodiment of a network element that uses a hardware shadow and a partial software index for a CPU failover.

FIG. 11 is a block diagram of one embodiment of a network element 1100 that uses a hardware shadow and a partial software index for a CPU failover. As in FIG. 10, in FIG. 11, the network element 1100 includes a data plane 1102 and a control plane 1104. In addition, the control plane 1104 includes an active CPU 1110A, active software index 1112A, standby CPU 1110B, partial software index 1116, shadow software index 1112B, and hardware shadow 1114. In addition, in FIG. 11, the active CPU has failed. In one embodiment, the active CPU 1110A can fail due to a hardware or software failure. As described in FIG. 10, the partial software index 1116 references data stored in one or more tables of the hardware table(s) 1108 and the hardware shadow 1114 includes a copy of the data that is not referenced by the partial software index 1116.

In response to the active CPU failure, an active CPU failure signal 1118 is sent to the standby CPU 1110B. In one embodiment, the standby CPU 1110B receives this signal and begins the process of assuming control of the network element processing functions. In this embodiment, during the failover, the hardware forwarding engines continue to process network data. In one embodiment, because the data in the hardware shadow 1114 has a different order than the data stored in the hardware table(s) 1108, the data from the hardware shadow 1114 is copied 1122 to the corresponding hardware table(s) 1108. In one embodiment, the data is copied using bulk data transfers with co-processors. In another embodiment, the one or more of hardware table(s) 1108 are inserted with a "safe" rule that allows the processing functions associated with that hardware table to be in a consistent state during the copying of the data.

In one embodiment, because the partial software index 1116 references data in one or more tables in the hardware table(s) 1008, the standby CPU 1010B uses this partial software index 1116 to access 1124 the data in these tables in the hardware table(s) 1108. For example and in one embodiment, the partial software index 1116 may reference data in a routing table, MAC address table, and/or ACL table. In one embodiment, by using the partial software index 1116 for some and not all of the tables in the hardware table(s) 1108, the complexity of a full software index is reduced. In addition, by using the partial software index 1116 for large hardware tables, the data copying time is reduced for the tables supported by the hardware shadow 1114. Handling of a failover with a partial software index 1116 is further descried in FIG. 14 below. In one embodiment, the standby CPU 1110B includes a hybrid hardware shadow failover module 1120 that uses the hardware shadow 1114 and partial software index 1116 for CPU failover.

Figure 12:
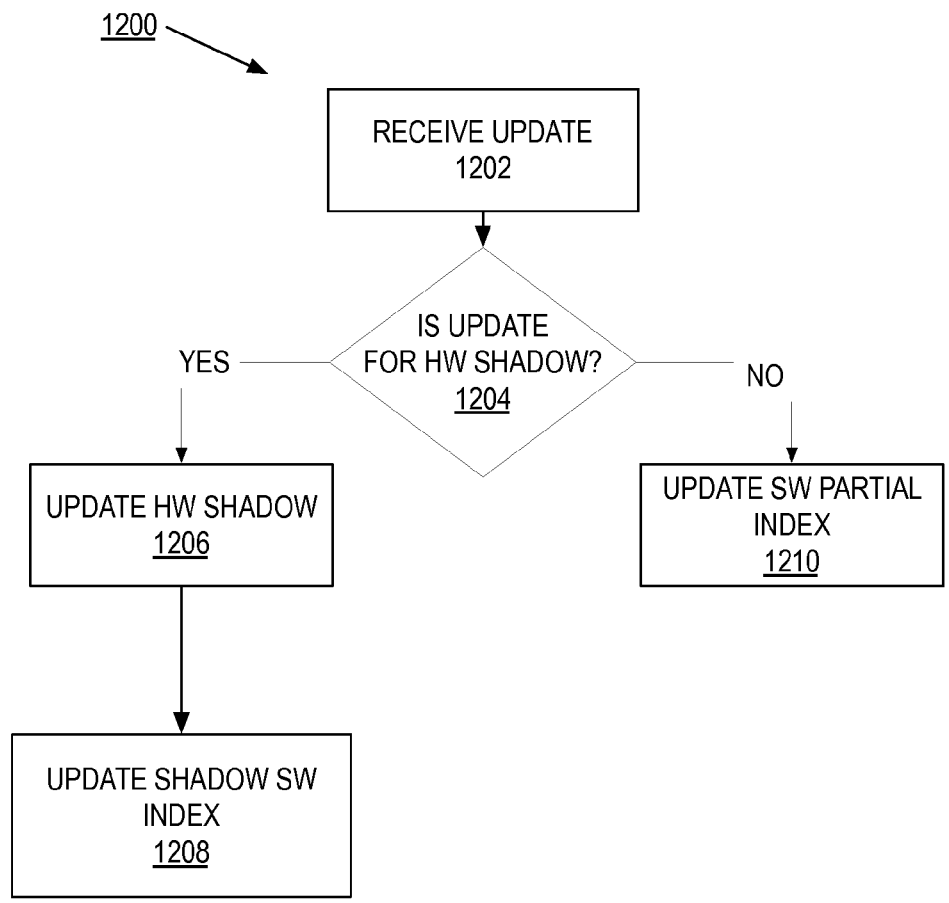
FIG. 12 is a flow diagram of one embodiment of a process to maintain a hardware shadow and a partial software index.

FIG. 12 is a flow diagram of one embodiment of a process 1200 to maintain a hardware shadow and a partial software index. In one embodiment, a hybrid hardware shadow update module performs process 1200, such as the hybrid hardware shadow update module 1020 as described in FIG. 10 above. In FIG. 12, process 1200 begins by receiving an update for the hardware shadow at block 1202. In one embodiment, process 1200 receives the state update from the active CPU such as the active CPU 310A described in FIG. 3 above. In one embodiment, the update includes data that is to update an entry in one of the tables in the hardware shadow. In one embodiment, the update can be adding a new entry for a table, deleting an entry for a table, and modifying that entry. For example and in one embodiment, the update could be an additional entry for a routing table that is part of the hardware shadow. In another example, the update could be the deletion of an access control list rule. As a further example, the update can be a modification to a MAC address port association. In one embodiment, the update can be a generic state or a hardware shadow update as described in FIG. 3 above.

In another embodiment, the update can be a management state update to the partial software index, such as the partial software index described in FIGS. 10 and 11 above. In one embodiment, the update can be "Route 192.168.1.0/24 with destination ROUTER1" got added to the routing table. Or "MAC M in VLAN V is now on port P".

At block 1204, process 1200 determines if the update is for the hardware shadow. If the update is not for the hardware shadow and for the partial software index, execution proceeds to block 1210 below. If the update is for the hardware shadow, process 1200 updates the hardware shadow at block 1206. In one embodiment, process 1200 determines which table the update is for and updates that table accordingly. In another embodiment, if the update were to delete an entry, process 1200 locates the entry for that table in the hardware shadow. Once the entry was located, process 1200 deletes the entry and updates the hardware table accordingly. In a further example of an embodiment, if the update is to modify an existing entry, process 1200 would find that entry in the corresponding table and modify the entry accordingly. Process 1200 updates the shadow software index of block 1208. In one embodiment, the shadow software index is updated using generic state updates as described in FIG. 3 above.

At block 1210, process 1200 updates the partial software index. In one embodiment, process 1200 updates the partial software index to indicate the management state change (e.g., insert, delete, or modify an entry).

Figure 13:
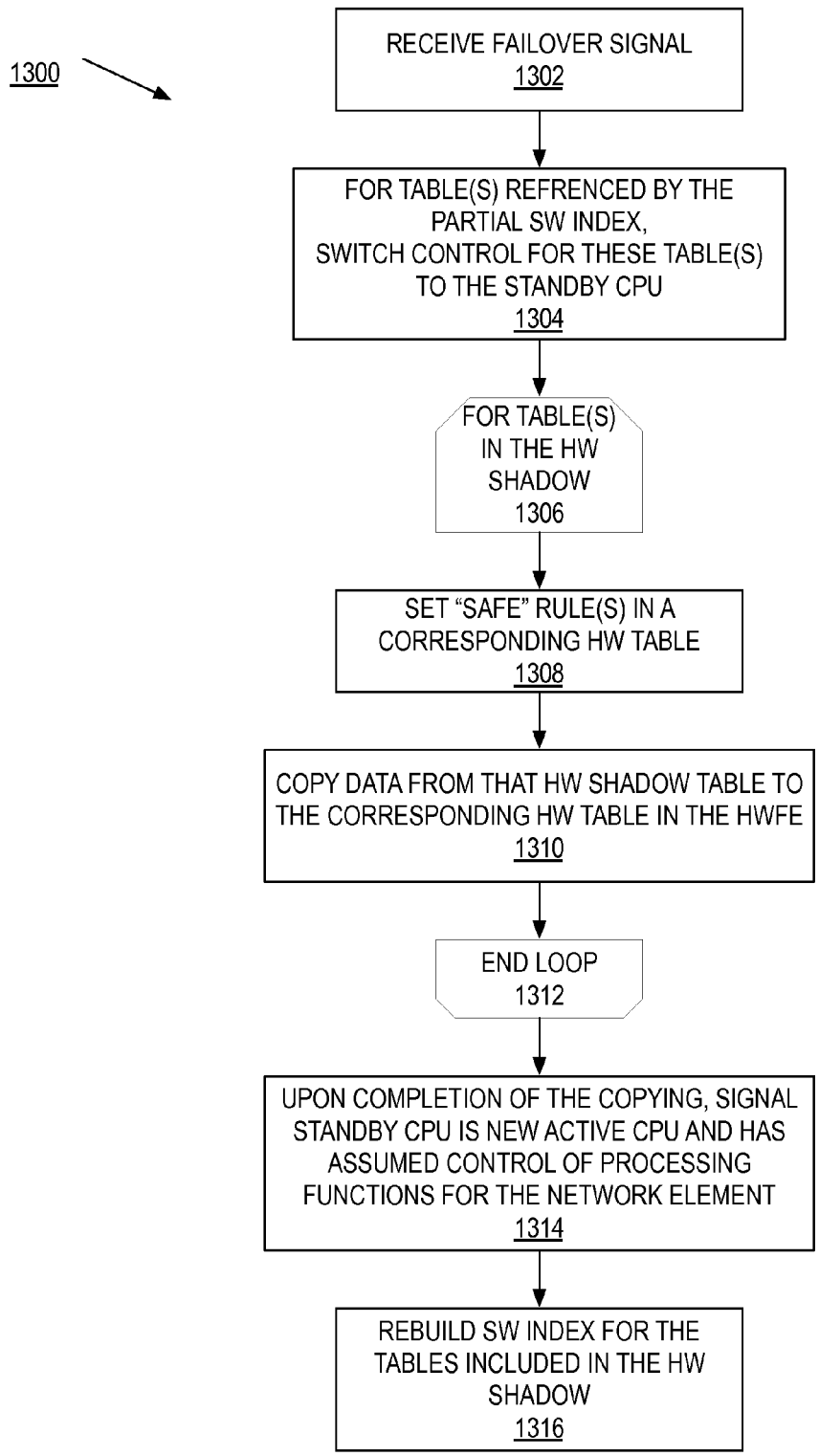
FIG. 13 is a flow diagram of one embodiment of a process to use a hardware shadow and a partial software index for a CPU failover.

FIG. 13 is a flow diagram of one embodiment of a process to use a hardware shadow and a partial software index for a CPU failover. In one embodiment, a hybrid hardware failover update module performs process 1300, such as the hybrid hardware failover update module 1120 as described in FIG. 11 above. In FIG. 13, process 1300 begins by receiving a failover signal at block 1302. In one embodiment, process 1300 receives the failover signal from a watchdog component of the network element. In one embodiment, the CPU failure can be a hardware failure or software failure. At block 1304, process 1300 switches control for tables that are referenced by the partial software index. In one embodiment, the partial software index references one or more of the larger tables in the hardware tables. In this embodiment, this leaves little or no downtime for the control of the processing functions associated with these tables. For example and in one embodiment, the partial software index could reference a routing table, MAC address table, ACL, and/or another hardware table.

Process 1300 performs a processing loop (block 1306-block 1312) for each table in the hardware shadow to copy the data from that table in the hardware shadow to a corresponding table in the hardware tables. At block 1308, process 1300 sets a safe rule in the hardware table that corresponds to the table in the hardware shadow being operated on by process 1300. In one embodiment, process 1300 sets the safe rule for tables that could affect them and any processing function associated with that table. In one embodiment, the safe rule puts the processing function in a consistent state during the time when the data is copied over from the hardware shadow table to the corresponding table in the hardware table. While in one embodiment, a safe rule is added for each table in the hardware table that is receiving data from the hardware shadow tables, in alternate embodiments, the safe rule is added to one or some of the tables in the hardware tables during the copy of the data.

At block 1310, process 1300 copies data from the hardware shadow table to the corresponding hardware table in the hardware forwarding engine. In one embodiment, the copying can be done using a coprocessor associated with that hardware forwarding engine. In this embodiment the coprocessor does bulk data copying, which can be faster than element by element copy using a CPU. In one embodiment, the coprocessor copies the data by accessing the data from the DRAM memory in the network element where the hardware shadow table is stored. In this embodiment, the coprocessor uses a PCI bus to copy the data over to the hardware tables. In one embodiment, the safe rule for the target hardware table is overwritten at the end of the data copying. The processing loop ends at block 1312.

At block 1314, upon completion of the copying of the data in the processing loop above, process 1300 signals that the standby CPU is the new active CPU and has assumed control of the processing functions for the network element. At block 1316, process 1300 rebuilds the software index for the standby CPU. In one embodiment, the software index for the standby CPU is the shadow software index that the standby CPU built and maintained prior to the CPU failover. For example and in one embodiment, process 1300 uses the shadow software index that was built and maintained as described in FIG. 12 above.

Figure 14:
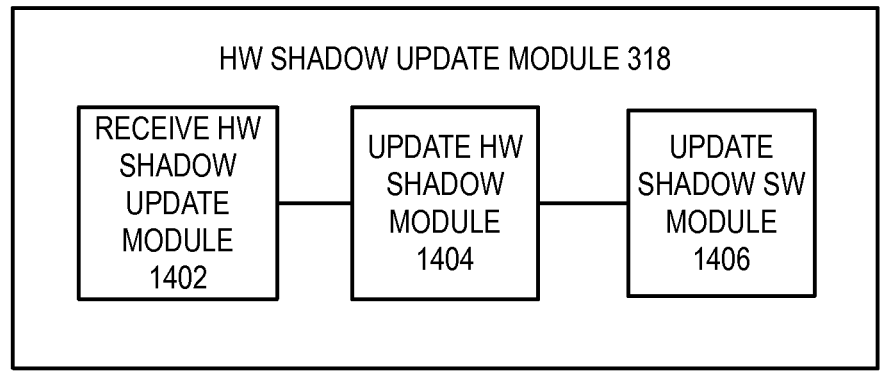
FIG. 14 is a block diagram of a hardware shadow update module that updates a hardware shadow.

FIG. 14 is a block diagram of a hardware shadow update module 318 that updates a hardware shadow. In one embodiment, the hardware shadow update module includes receive hardware shadow update module 1402, update hardware shadow module 1404, and update shadow software module 1406. In one embodiment, the receive hardware shadow update module 1402 receives the hardware shadow update as described in FIG. 5, block 502 above. The update hardware shadow module 1404 updates the hardware shadow as described in FIG. 5, block 504 above. The update shadow software module 1406 updates the shadow software index as described in FIG. 5, block 506 above.

Figure 15:
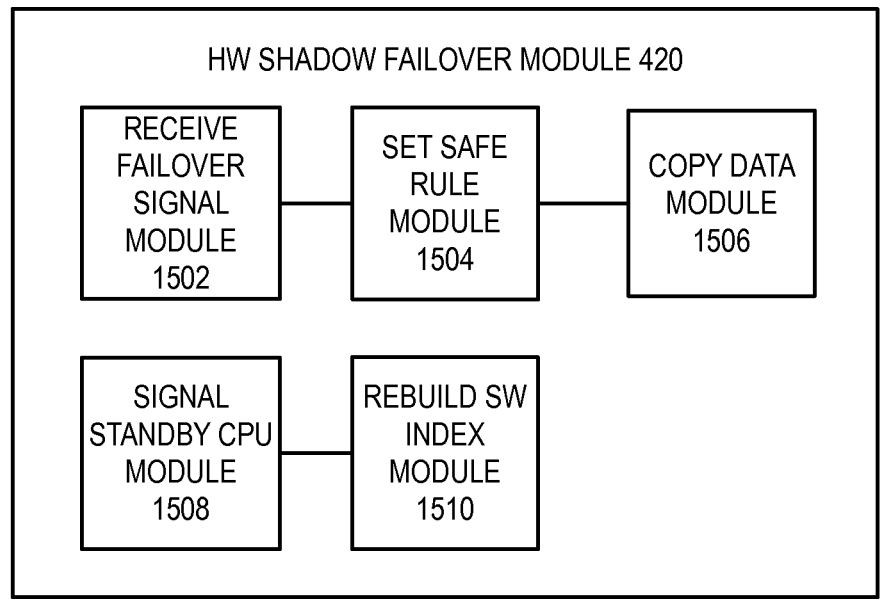
FIG. 15 is a block diagram of a hardware shadow failover module that uses a hardware shadow for a CPU failover.

FIG. 15 is a block diagram of a hardware shadow failover module 420 that uses a hardware shadow for a CPU failover. In one embodiment, the hardware shadow failover module 420 includes receive failover signal module 1502, set safe rule module 1504, copy data module 1506, signal standby CPU module 1508, and rebuild software index module 1510. In one embodiment, the receive failover signal module 1502 receives the failover signal as described in FIG. 6, block 602 above. The set safe rule module 1504 sets the safe rule for a hardware table as described in FIG. 6, block 606 above. The copy data module 1506 copies the data to the hardware table as described in FIG. 6, block 608 above. The signal standby CPU module 1508 signals that the standby CPU has assumed control of the network element processing functions as described in FIG. 6, block 612 above. The rebuild software index module 1510 rebuilds the software index as described in FIG. 6, block 614 above.

Figure 16:
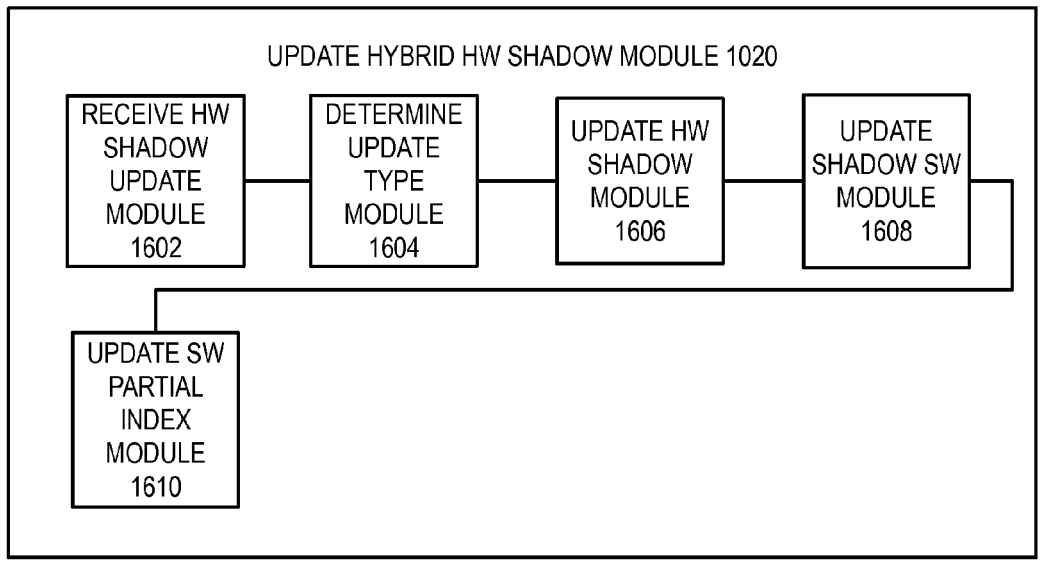
FIG. 16 is a block diagram of a hybrid hardware shadow update module that updates a hardware shadow and a partial software index.

FIG. 16 is a block diagram of a hybrid hardware shadow update module 1020 that updates a hardware shadow and a partial software index. In one embodiment, the hybrid hardware shadow update module 1020 includes receive hardware shadow update module 1602, determine update type module 1604, update hardware shadow module 1606, update shadow software module 1608, and update partial software index module 1610. In one embodiment, the receive hardware shadow update module 1602 receives an update as described in FIG. 12, block 1202 above. The determine update type module 1604 determines the type of update as described in FIG. 12, block 1204 above. The update hardware shadow module 1606 updates the hardware shadow as described in FIG. 12, block 1206 above. The update shadow software module 1406 updates the shadow software index as described in FIG. 12, block 1208 above. The update partial software index module update the partial software index as described in FIG. 12, block 1210 above.

Figure 17:
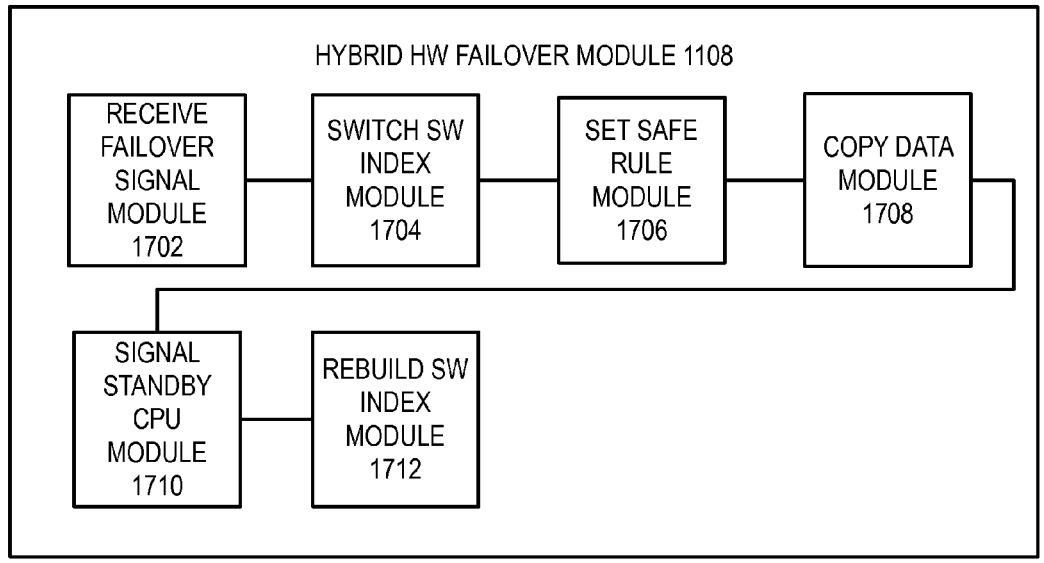
FIG. 17 is a block diagram of a hybrid hardware shadow failover module that uses a hardware shadow and a partial software index for a CPU failover.

FIG. 17 is a block diagram of a hybrid hardware shadow failover module 1108 that uses a hardware shadow and a partial software index for a CPU failover. In one embodiment, the hybrid hardware shadow failover module 1108 includes receive failover signal module 1702, switch software index module 1704, set safe rule module 1706, copy data module 1708, signal standby CPU module 1710, and rebuild software index module 1712. In one embodiment, the receive failover signal module 1702 receives the failover signal as described in FIG. 13, block 1302 above. The switch software index module 1704 switches control to the partial software index as described in FIG. 13, block 1304 above. The set safe rule module 1706 sets the safe rule for a hardware table as described in FIG. 13, block 1308 above. The copy data module 1708 copies the data to the hardware table as described in FIG. 13, block 1310 above. The signal standby CPU module 1710 signals that the standby CPU has assumed control of the network element processing functions as described in FIG. 13, block 1314 above. The rebuild software index module 1712 rebuilds the software index as described in FIG. 13, block 1316 above.

Figure 18:
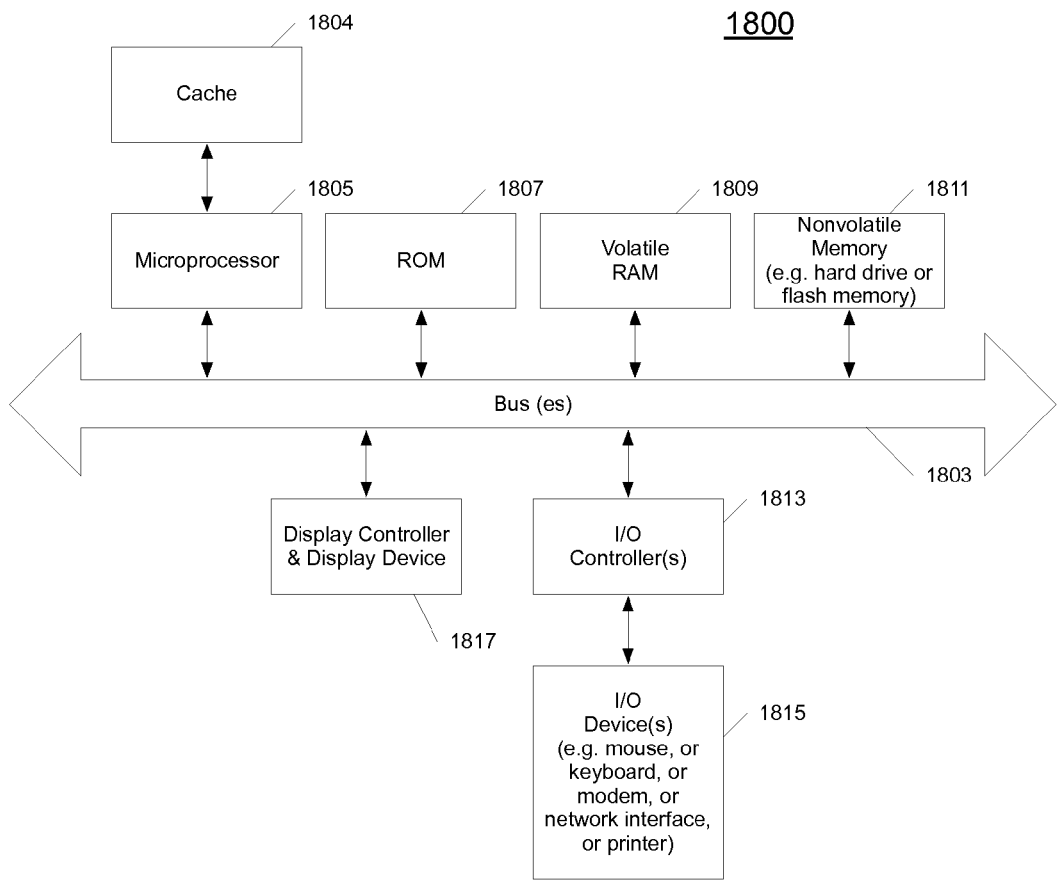
FIG. 18 illustrates one example of a typical computer system, which may be used in conjunction with the embodiments described herein.

FIG. 18 shows one example of a data processing system 1800, which may be used with one embodiment of the present invention. For example, the system 1800 may be implemented including a network element 300 as shown in FIG. 3. Note that while FIG. 18 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 18, the computer system 1800, which is a form of a data processing system, includes a bus 1803 which is coupled to a microprocessor(s) 1805 and a ROM (Read Only Memory) 1807 and volatile RAM 1809 and a non-volatile memory 1811. The microprocessor 1805 may retrieve the instructions from the memories 1807, 1809, 1811 and execute the instructions to perform operations described above. The bus 1803 interconnects these various components together and also interconnects these components 1805, 1807, 1809, and 1811 to a display controller and display device 1817 and to peripheral devices such as input/output (I/O) devices which may be mice, keyboards, modems, network interfaces, printers and other devices which are well known in the art. In one embodiment, the system 1800 includes a plurality of network interfaces of the same or different type (e.g., Ethernet copper interface, Ethernet fiber interfaces, wireless, and/or other types of network interfaces). In this embodiment, the system 1800 can include a forwarding engine to forward network data received on one interface out another interface.

Typically, the input/output devices 1815 are coupled to the system through input/output controllers 1813. The volatile RAM (Random Access Memory) 1809 is typically implemented as dynamic RAM (DRAM), which requires power continually in order to refresh or maintain the data in the memory.

The mass storage 1811 is typically a magnetic hard drive or a magnetic optical drive or an optical drive or a DVD ROM/RAM or a flash memory or other types of memory systems, which maintain data (e.g. large amounts of data) even after power is removed from the system. Typically, the mass storage 1811 will also be a random access memory although this is not required. While FIG. 18 shows that the mass storage 1811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 19:
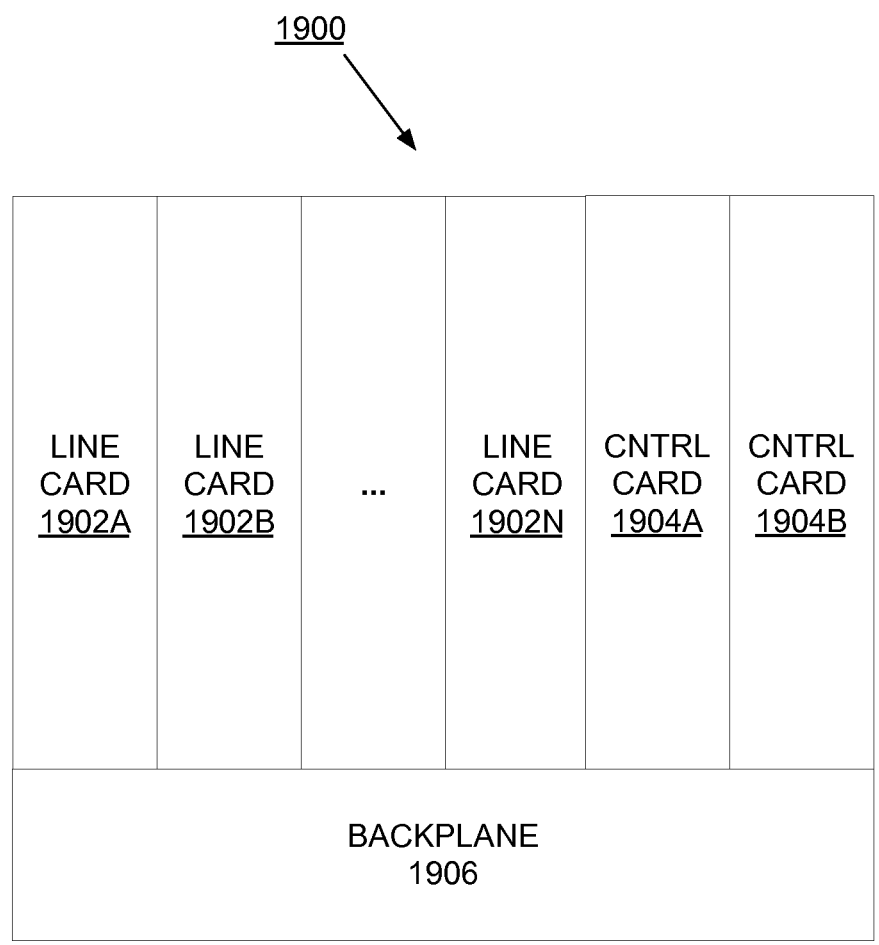
FIG. 19 is a block diagram of one embodiment of an exemplary network element that uses a hardware shadow for a CPU failover.

FIG. 19 is a block diagram of one embodiment of an exemplary network element 1900 that uses a hardware shadow for a CPU failover. In FIG. 19, the backplane 1906 couples to the line cards 1902A-N and controller cards 1904A-B. While in one embodiment, the controller cards 1904A-B control the processing of the traffic by the line cards 1902A-N, in alternate embodiments, the controller cards 1904A-B, perform the same and/or different functions (e.g., using a hardware shadow for a CPU failover, etc.). In one embodiment, the line cards 1902A-N process and forward traffic according to the network policies received from controller cards the 1904A-B. In one embodiment, the controller cards 1904A-B use a hardware shadow for a CPU failover as described in FIGS. 5, 6, 12, and 13. In this embodiment, one or both of the controller cards include modules to use a hardware shadow for a CPU failover, such as the hardware shadow update module 318, hardware shadow failover module 420, hybrid hardware shadow update module 1020, and hybrid hardware shadow failover module 1120 as described in FIGS. 3, 4, 10, and 11, respectively above. It should be understood that the architecture of the network element 1900 illustrated in FIG. 19 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "switching," "determining," "copying," "inserting," "signaling," "applying," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to switch control of processing functions of a network element from an active central processing unit to a standby central processing unit, the method comprising:
   receiving a signal that the active central processing unit has failed, wherein the active central processing unit controls the processing functions of the network element and the network element includes a hardware forwarding engine;
   for each shadow table in a plurality of shadow tables in a hardware shadow,
      copying data from that shadow table to a corresponding one of a plurality of hardware tables for the hardware forwarding engine, wherein a hardware shadow stores a copy of the data stored in the plurality of hardware tables in a different structure and in a different order than in the plurality of hardware tables for the hardware forwarding engine; and
   in response to the copying, switching control of processing functions of the network element from the active central processing unit to a standby central processing unit.

2. The non-transitory machine-readable medium of claim 1, wherein the controlling of the network element processing functions with the standby central processing unit uses a shadow software index, wherein the shadow software index provides access to data of the hardware shadow for the standby central processing unit.

3. The non-transitory machine-readable medium of claim 2, further comprising:
   reconciling the shadow software index with the hardware shadow.

4. The non-transitory machine-readable medium of claim 2, wherein the shadow software index includes data that is different from the data included in an active software index and the active software index provides access for the active central processing unit to the data stored in the plurality of hardware tables for the hardware forwarding engine.

5. The non-transitory machine-readable medium of claim 1, wherein the hardware shadow includes at least one of the plurality of shadow tables that is a permutation of a corresponding hardware table in the plurality of hardware tables.

6. The non-transitory machine-readable medium of claim 1, wherein the copying includes,
   inserting a safe rule into the corresponding hardware table, wherein the safe rule allows a processing function associated with the corresponding hardware table to be in a consistent state.

7. The non-transitory machine-readable medium of claim 6, wherein the safe rule is selected from the group consisting of dropping traffic for that processing function, forwarding the traffic to a different forwarding engine, and forwarding the traffic to a central processing unit.

8. The non-transitory machine-readable medium of claim 1, wherein the copying further comprises:
copying the data into the corresponding hardware table such that the safe rule is not overwritten until the last entry of the corresponding hardware table is stored.

9. The non-transitory machine-readable medium of claim 1, further comprising:
signaling that the standby central processing unit is a new active central processing unit and has assumed control of the processing functions of the network element.

10. The non-transitory machine-readable medium of claim 1, wherein in response to the copying, the hardware shadow is synchronized with the plurality of hardware tables.

11. The non-transitory machine-readable medium of claim 1, wherein the copying data from that shadow table to a corresponding one of a plurality of hardware tables is performed asynchronously by one or more co-processors.

12. A non-transitory machine-readable medium having executable instructions to cause one or more processing units to perform a method to update a hardware shadow of a network element, the method comprising:
receiving a hardware shadow update, wherein the hardware shadow is used in a process of failing over control of processing functions of the network from an active central processing unit to a standby processing unit, the hardware shadow includes configuration data for one of a plurality of hardware forwarding engines of the network element, the hardware shadow stores a copy of the data stored in a plurality of hardware tables in a different structure and in a different order than in the plurality of hardware tables for a hardware forwarding engine, and the hardware shadow update is an update to one of a plurality of shadow tables of the hardware shadow; and
applying the update to the one of the plurality of hardware shadow tables.

13. The non-transitory machine-readable medium of claim 12, further comprising:
updating a shadow software index for the hardware shadow, wherein the shadow software index provides access to the plurality of shadow tables for the standby central processing unit.

14. The non-transitory machine-readable medium of claim 13, wherein the shadow software index includes data that is different from the data included in an active software index and the active software index provides access for an active central processing unit to the data stored in a plurality of hardware tables for the hardware forwarding engine.

15. The non-transitory machine-readable medium of claim 14, wherein the active central processing unit controls the network element processing functions and the standby central processing unit takes over the control of the network element processing functions in an event that the active central processing unit has a failure.

16. The non-transitory machine-readable medium of claim 13, wherein the hardware shadow includes at least one of the plurality of shadow tables that is a permutation of a corresponding hardware table in the plurality of hardware tables.

17. The non-transitory machine-readable medium of claim 13, wherein the hardware shadow update is selected from the group consisting of an addition of an entry in one of the plurality shadow tables, a deletion of an entry in one of the plurality of shadow tables, and a modification to data of an entry in one of the plurality shadow tables.

18. The non-transitory machine-readable medium of claim 13, wherein one of the plurality of shadow tables is selected from the groups consisting of a routing table, a media access control table, and an access control list.

19. A non-transitory machine-readable medium having executable instructions to cause one or more processing units to perform a method to switch control of processing functions of a network element from an active central processing unit to a standby central processing unit, the method comprising:
receiving a signal that the active central processing unit has failed, wherein the active central processing unit controls the processing functions of the network element, and the network element includes a hardware forwarding engine, a hardware shadow and a partial software index for the standby central processing unit;
for each hardware table in the plurality of hardware tables referenced in the partial software index, switching control to the standby central processing unit of a processing function of the network element that utilizes data stored in that hardware table; and
for each shadow table in a plurality of shadow tables in the hardware shadow,
copying data from that shadow table to a corresponding one of a plurality of hardware tables in the hardware forwarding engine, wherein the hardware shadow stores a copy of the data in the plurality of hardware tables in a different structure and in a different order than stored in the plurality of hardware tables for the hardware forwarding engine and not referenced by the partial software index, and
in response to the copying, switching control to the standby central processing unit of a processing function of the network element that utilizes data associated with that shadow table.

20. A non-transitory machine-readable medium having executable instructions to cause one or more processing units to perform a method to update a hardware shadow or a partial software index of a network element, the method comprising:
receiving an update, wherein the update is an update for one of the hardware shadow and the partial software index, the hardware shadow is used to failover a control of processing functions of the network from an active central processing unit to a standby processing unit, the hardware shadow includes configuration data for one of a plurality of hardware forwarding engines of the network element, the hardware shadow stores a copy of the data stored in a plurality of hardware tables in a different structure and in a different order than in the plurality of hardware tables for a hardware forwarding engine, and the partial software index references data stored in a plurality of hardware tables and not stored in the hardware shadow;
determining if the update is for the hardware shadow or the partial software index; and
if the update is for the hardware shadow,
applying the update to the hardware shadow update for the one of the plurality of hardware shadow tables; and
if the update is for the partial software index,
applying the update to the partial software index.

21. A method to switch control of processing functions of a network element from an active central processing unit to a standby central processing unit, the method comprising:

receiving a signal that the active central processing unit has failed, wherein the active central processing unit controls the processing functions of the network element and the network element includes a hardware forwarding engine;

for each shadow table in a plurality of shadow tables in a hardware shadow,
copying data from that shadow table to a corresponding one of a plurality of hardware tables for the hardware forwarding engine, wherein a hardware shadow stores a copy of the data stored in the plurality of hardware tables in a different structure and in a different order than in the plurality of hardware tables for the hardware forwarding engine; and in response to the copying, switching control of processing functions of the network element from the active central processing unit to a standby central processing unit.

22. A method to update a hardware shadow of a network element, the method comprising:
receiving a hardware shadow update, wherein the hardware shadow is used in a process of failing over control of processing functions of the network from an active central processing unit to a standby processing unit, the hardware shadow includes configuration data for one of a plurality of hardware forwarding engines of the network element, the hardware shadow stores a copy of the data stored in a plurality of hardware tables in a different structure and in a different order than in the plurality of hardware tables for a hardware forwarding engine, and the hardware shadow update is an update to one of a plurality of shadow tables of the hardware shadow; and applying the update to the one of the plurality of hardware shadow tables.

23. A method to switch control of processing functions of a network element from an active central processing unit to a standby central processing unit, the method comprising:
receiving a signal that the active central processing unit has failed, wherein the active central processing unit controls the processing functions of the network element, and the network element includes a hardware forwarding engine, a hardware shadow and a partial software index for the standby central processing unit;

for each hardware table in the plurality of hardware tables referenced in the partial software index, switching control to the standby central processing unit of a processing function of the network element that utilizes data stored in that hardware table; and for each shadow table in a plurality of shadow tables in the hardware shadow,
copying data from that shadow table to a corresponding one of a plurality of hardware tables in the hardware forwarding engine, wherein the hardware shadow stores a copy of the data in the plurality of hardware tables in a different structure and in a different order than stored in the plurality of hardware tables for the hardware forwarding engine and not referenced by the partial software index, and in response to the copying, switching control to the standby central processing unit of a processing function of the network element that utilizes data associated with that shadow table.

24. A method to update a hardware shadow or a partial software index of a network element, the method comprising:
receiving an update, wherein the update is an update for one of the hardware shadow and the partial software index, the hardware shadow is used to failover a control of processing functions of the network from an active central processing unit to a standby processing unit, the hardware shadow includes configuration data for one of a plurality of hardware forwarding engines of the network element, the hardware shadow stores a copy of the data stored in a plurality of hardware tables in a different structure and in a different order than in the plurality of hardware tables for a hardware forwarding engine, and the partial software index references data stored in a plurality of hardware tables and not stored in the hardware shadow;

determining if the update is for the hardware shadow or the partial software index; and if the update is for the hardware shadow,
applying the update to the hardware shadow update for the one of the plurality of hardware shadow tables; and if the update is for the partial software index,
applying the update to the partial software index.

* * * * *